United States Patent [19]

Baur

[11] Patent Number: 4,727,743
[45] Date of Patent: Mar. 1, 1988

[54] ARRANGEMENT FOR THE COVERING OF AN UNDERFLOOR POWER CONTAINING CHANNEL IN THE SPACE BELOW A MOVING AREA OF A SLIDEABLE MOVING TABLE OF A PRESS

[75] Inventor: Siegfried Baur, Goeppingen, Fed. Rep. of Germany

[73] Assignee: L. Schuler GmbH, Goeppingen, Fed. Rep. of Germany

[21] Appl. No.: 906,133

[22] Filed: Sep. 10, 1986

[30] Foreign Application Priority Data

Sep. 21, 1985 [DE] Fed. Rep. of Germany ....... 3533767

[51] Int. Cl.⁴ .............................................. B21J 13/08
[52] U.S. Cl. ....................................... 72/446; 72/455; 100/918; 100/224
[58] Field of Search ........................ 72/455, 448, 446; 100/214, 224, 237, 918

[56] References Cited

U.S. PATENT DOCUMENTS 3,111,100 11/1963 Georgeff ............................... 72/448

FOREIGN PATENT DOCUMENTS 1602500 8/1973 Fed. Rep. of Germany ...... 100/918
2656638 6/1978 Fed. Rep. of Germany .
2120941 4/1980 Fed. Rep. of Germany ...... 100/918
133937 7/1985 Japan ..................................... 72/448

Primary Examiner—Robert L. Spruill
Assistant Examiner—David B. Jones
Attorney, Agent, or Firm—Barnes & Thornburg

[57] ABSTRACT

A sliding table, used for the exchange of tool or die sets of a press is moved into and out of the press on rails. The driving motion is caused by an adjusting mechanism in the sliding table. An underfloor power containing channel extends parallel to the moving direction of the sliding table and is used for containing at least one power supply line taken along by the sliding table. The underfloor power containing channel is closed in an upward direction by a covering, consisting of individual cover members, flexibly connected with one another and with its own drive which causes pre-stressing of the cover members prior to movement of the sliding table.

20 Claims, 4 Drawing Figures

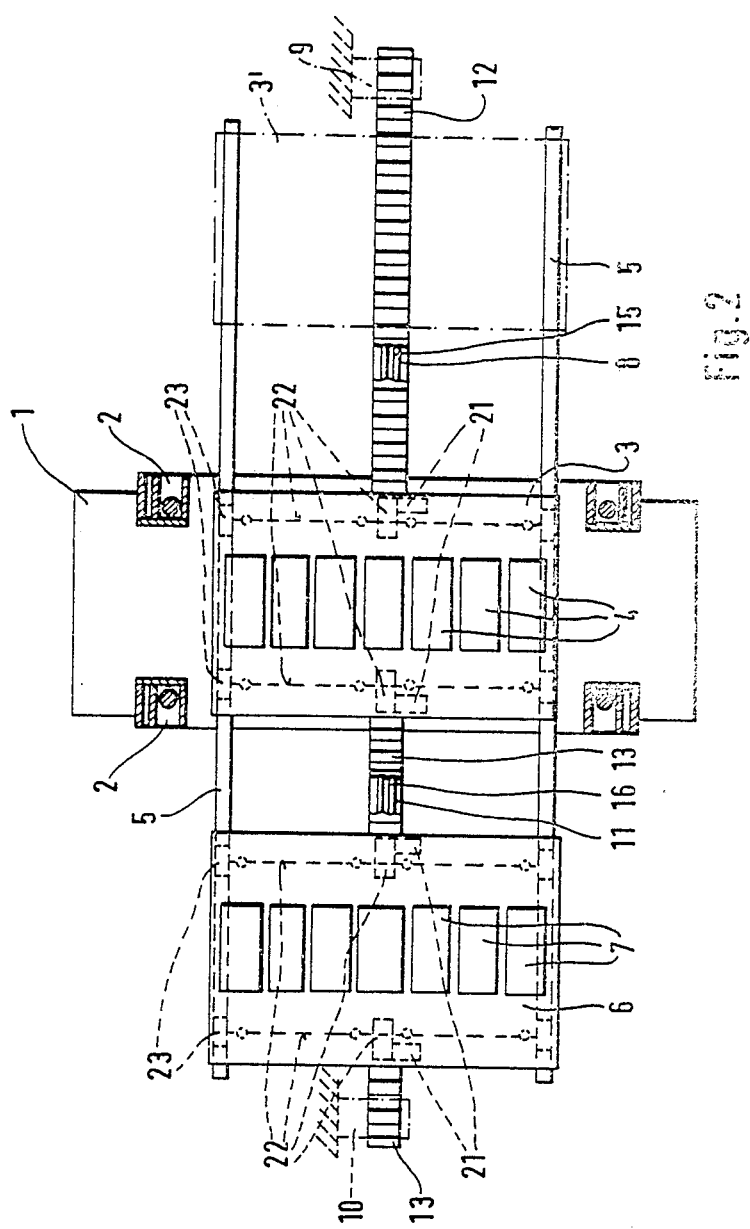

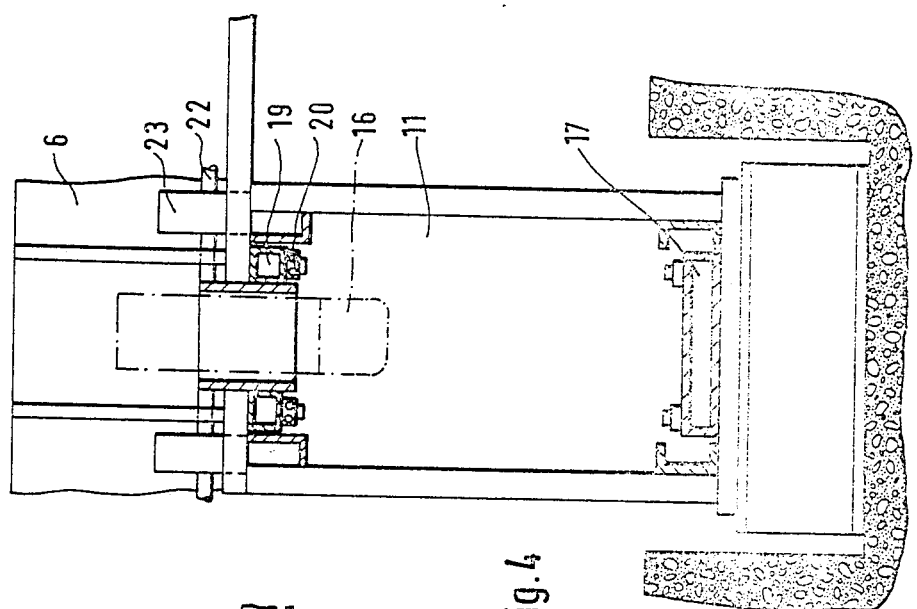
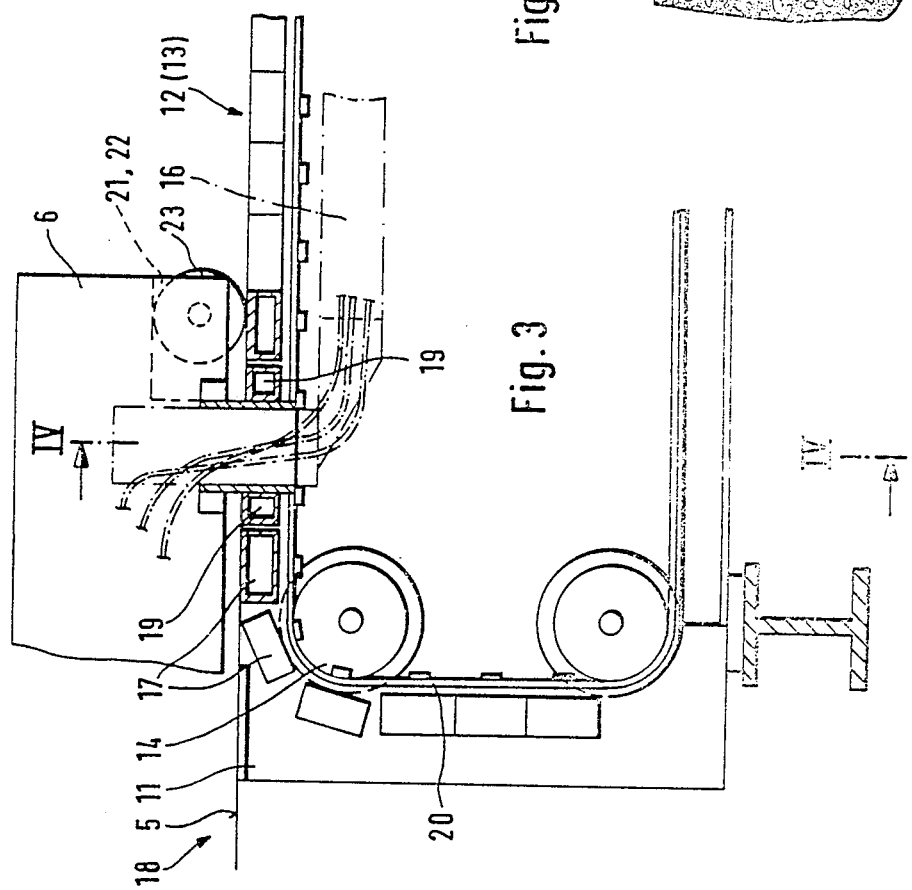

ARRANGEMENT FOR THE COVERING OF AN UNDERFLOOR POWER CONTAINING CHANNEL IN THE SPACE BELOW A MOVING AREA OF A SLIDEABLE MOVING TABLE OF A PRESS

BACKGROUND OF THE INVENTION

This invention relates to an arrangement for the covering of an underfloor power conduit containing channel in the space below the moving area of a sliding table which can be moved into a press and out of it. There being also provided an adjusting means for driving the sliding table into and out of the press on rails that extend on both sides of the sliding table and in the direction of table movement.

Tools and dies for the shaping of large-surface workpieces are arranged on sliding tables that can be moved into the press and out of it. The setting-up of the tools and dies outside of the press requires supplying the sliding tables with a source of pressure for power. Accordingly, pressure supply lines must be movable in concert with the driving motion of the sliding tables. The pressure supply lines are housed in underfloor coverable channels in order to be protected from damage and to ensure free access to the press and sliding table as well as an unhindered passing by the press.

BRIEF DESCRIPTION OF THE PRIOR ART

In DE-PS No. 14 02 540 sliding tables carrying tools are guided in rails and are arranged so that they can be moved via a transmission chain. The chains are driven by electric motors that are fixed at the press in a channel. No pressure supply lines are provided for the sliding table that is moved out of the press.

In DE-OS No. 26 56 638, a movable covering for: energy supply lines, slideways and similar devices is shown on a machine tool and has a shutter-type covering consisting of a number of cover members that are flexibly connected with one another. The covering, in one embodiment is placed around deflecting rollers to form a loop, with ends fastened at opposite sides of a sliding table. The sliding table can be moved via an adjusting means arranged in the machine tool as normal in these types of machines. The driving motion is obtained via a screw drive mechanisms and leading spindles, which motion is thus transferred to the sliding table.

SUMMARY OF THE INVENTION

In contrast to the above prior art disclosures, it is the objective of the invention to provide a cover for the underfloor channel so as to avoid accidents and to do so in a stable way which would permit equipment, such as fork lift truck, stackers and carts to drive, or ride, over the underfloor channels. To allow for such equipment to pass over the channels, it is essential that the channel covering follow the movement of the sliding table, while allowing a tilting of the covering elements. The covering is constructed of individual elements and requires a coordinated driving of the sliding table into and out of the press into the tool adjusting station in concert with the movement of the covering elements.

This objective is achieved having the sliding table travel on two parallel rails. At least one underfloor channel is arranged between the rails of the housing to house at least one pressure supply line connected to the sliding table and movable with said sliding table and the underfloor channel is kept closed by at least one shutter-type covering. The adjusting means providing the driving motion of the sliding table is arranged in the sliding table, transferring the driving motion via transmission transfer means to wheels guided in, or on, the rails. The adjusting means for providing the moving motion of the covering is arranged in the underfloor channel, with end parts thereof fastened at the sliding table. Switching means are arranged for the control of the two adjusting means in such a way that the adjusting means for the movement of the covering is controlled before the adjusting means for the driving motion of the sliding table is controlled in order to pre-stress the covering means in its movement direction prior to movement of the sliding table.

By the use of separate, but coordinated adjusting mechanisms, smooth moving operation of each of the sliding tables and of the covering elements with the use of smaller motors is obtained in that each motor drives its own load, i.e., the sliding table or the covering elements, respectively. Further, the motors are of the reversing type. The motion for the cover elements can be located in the power supply channel at a position remote from the press, thus allowing for easier and cheaper access and repair as well as reducing the bulk and mechanisms of the press itself. Likewise the motors for the sliding tables can be located on the tables themselves, with powers therefore coming from either the press or from the power supply channel. Under such operation, maintenance of, or non-functioning of the adjusting members in no way affects operation of the press itself.

Alternatively, the covering mechanism can be directly connected to the table with but a single drive for either the table or the cover, or with separate drives, as before, wherein the connection includes means to insure proper sequencing between the two drive motions, of the tables and the covering, by pre-stressing of the cover prior to the movement of the tables.

The covering elements can be attached to one another directly or to a common loop mechanism. The covering elements can be made to move in a circular motion at one or more ends of the channel to reduce the distance of lateral movement away from the press.

Advantages of the invention are essentially the moving of the sliding table and the covering that takes place without jerking. The adjusting means for the covering need only be dimensioned for the movement of the covering and need only be strong enough so that the covering is caused to be moved in the moving direction of the sliding table before the sliding table moves by means of its own drive. This results in a down sizing of the adjusting means driving the sliding table and permits the adjusting means for the table to be smaller so that low sliding tables may also be used.

BRIEF DESCRIPTION OF THE DRAWINGS

These and other objects, features, and advantages of the present invention will become more apparent from the following description when taken in connection with the accompanying drawings which show, for the purposes of illustration only, one embodiment in accordance with the present invention, and wherein:

FIG. 2 is a top view of the elements shown in FIG. 1 with the press shown in sectional view;

FIG. 3 is an enlarged representation of the covering device in the area of a deflecting zone located away from the press; and FIG. 4 is a sectional view taken along the section IV—IV in FIG. 3.

DESCRIPTION OF THE PREFERRED EMBODIMENT

Figure 1:
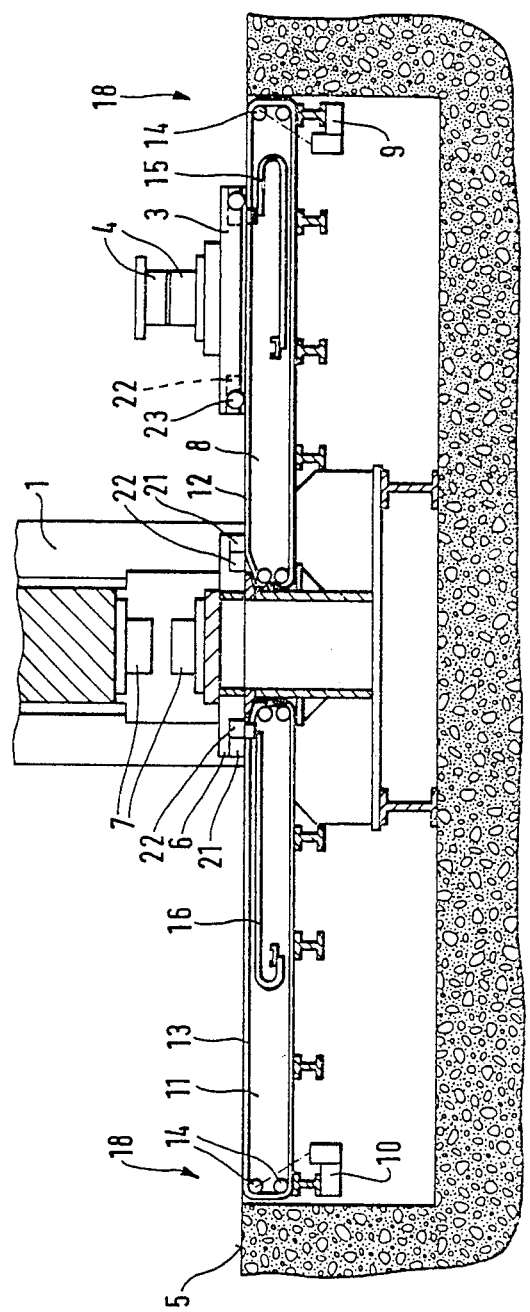
FIG. 1 is a lateral view of a press having two sliding tables and two covering devices.

Referring now to the drawings wherein like reference numerals are used to designate like parts and more particularly to FIGS. 1 and 2 which show a press 1 located in the clearance area and indicate a workpiece passage between four press supporting frames 2 (see FIG. 2). Sliding tables 3 and 6 each carry one tool or die set 4 and 7, respectively. Said sliding tables 3 and 6 being movable in, or on, rails 5 by adjusting means 21 and 22 driving wheels 23. In FIG. 1, the sliding table 3 is located in a position outside the press 1 in which tools, dies, or tool sets 4 can be exchanged and set up. In FIG. 2, position number 3' designates the position of the dash-dotted sliding table 3 outside the press 1. Underfloor channels 8 and 11 extend in the moving direction of the sliding tables 3 and 6 between the rails 5. The underfloor channels 8 and 11 are kept closed in upward direction by means of covering elements 12 and 13, which can be moved by means of adjusting means 9 and 10, fastened in the underfloor channels 8 and 11. The structure of the adjusting means 9 and 10 for the transfer of torques are not described in detail and can be of any well known type such as electronic controls and electric motors, fluid motors, selsyn system etc.

As shown particularly in FIGS. 3 and 4, each covering 12 and 13 consists of individual cover members 17. The coverings 12 and 13 are guided around deflecting rollers 14 to form a loop having end parts 19 fastened at the sliding tables 3 and 6 at the two sides of the sliding tables 3 and 6 that are opposite one another, at a distance, or in the area of these sides, so that the underfloor power channels 8 and 11 are covered in any position during the movement of the sliding tables 3 and 6. Guided along with the sliding tables 3 and 6 are supply lines 15 and 16, in the manner of a trailing cable. Although plural cables are shown, a single cable could be used. The cable(s) are located below the sliding tables 3 and 6 and are led upward from the underfloor power channels 8 and 11.

The adjusting means 9 and 10 are arranged in the areas away from the press, particularly in the deflecting zones 18 of the coverings 12 and 13 and drive at least one of the deflecting rollers 14. The deflecting rollers 14 can drive the coverings 12 and 13 directly when they are coupled together, or alternatively via a driving chain or belt when the cover members 17 and end parts 19 are flexibly fastened to the chain string 20.

Each sliding table 3 and 6 has at least one adjusting means 21 arranged to drive wheels 23 by means of the indicated transfer means 22 for producing driving motion of the sliding tables 3 and 6. The structure of transfer means can be of any well known mechanism, such as transmission, shafts, couplings, or combination thereof or similar means.

The control of all the adjusting means 9, 10 and 21 is caused by a central control system of the press 1 and takes place in such a way that initially the adjusting means 9 and 10 for the covering 12 and 13 is acted upon, so that a pre-stressing is produced in the covering members 17 and the end parts 19 of the covering 12 and 13, without moving the sliding table 3 and 6. It is only after the adjusting means 21 in the sliding table 3 and 6 is acted upon, that the sliding table 3 and 6 can be moved along the rails 5. The adjusting means 9, 10 and 21 may, for example, be reversible electric motors, or also air motors.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

What is claimed is:

1. An arrangement for the covering of an underfloor power containing channel for a sliding tool or die table of a press wherein:

the table is movable into and out of the press, first adjusting means for applying a driving motion to the sliding table, plural rail means extending on opposite sides of the press for supporting the sliding table in its movement, at least one underfloor power containing channel arranged between the rail means for the housing of at least one power supply line in the channel which supply line is connected to the sliding table and movable therewith, the underfloor power containing channel being closed by at least one shutter-type covering means, the first adjusting means for applying the driving motion to the sliding table being arranged at the sliding table and connected for transmitting driving motion to wheels on the table which are guided by the rails, a second adjusting means for moving the covering means and said second adjusting means arranged at the underfloor power containing channel and connected to the covering, the covering means having end parts fastened at the sliding table, and wherein control means are connectable to said first and second adjusting means for actuation of the first and second adjusting means such that said second adjusting means for the moving of the covering is actuated before said first adjusting means for the driving motion of the sliding table.

2. An arrangement according to claim 1, wherein the first and second adjusting means are reversible motors.

3. An arrangement according to claim 1, wherein the adjusting means moving and the covering is arranged in the underfloor power containing channel in a deflecting zone that is located away from the press.

4. An arrangement according to claim 2, wherein the adjusting means moving the covering is arranged in the underfloor power containing channel in a deflecting zone that is located away from the press.

5. An arrangement according to claim 1, wherein the supply line forms a loop between the power containing channel and the sliding table.

6. An arrangement according to claim 2, wherein the supply line forms a loop between the power containing channel and the sliding table.

7. An arrangement according to claim 3, wherein the supply line forms a loop between the power containing channel and the sliding table.

8. An arrangement according to claim 4, wherein the supply line forms a loop between the power containing channel and the sliding table.

9. An arrangement according to claim 1, wherein the cover means comprises a plurality of elements connected to one another.

10. An arrangement according to claim 3, wherein the cover means comprises a plurality of elements connected to one another.

11. An arrangement according to claim 5, wherein the cover means comprises a plurality of elements connected to one another.

12. An arrangement according to claim 7, wherein the cover means comprises a plurality of elements connected to one another.

13. An arrangement according to claim 9, wherein the plurality of elements are connected to one another utilizing a single driven element.

14. An arrangement according to claim 10, wherein the plurality of elements are connected to one another utilizing a single driven element.

15. An arrangement according to claim 11, wherein the plurality of elements are connected to one another utilizing a single driven element.

16. An arrangement according to claim 12, wherein the plurality of elements are connected to one another utilizing a single driven element.

17. An arrangement according to claim 13, wherein the plurality of elements are deflected circularly and downwardly at an end of the power containing channel.

18. An arrangement according to claim 14, wherein the plurality of elements are deflected circularly and downwardly at an end of the power containing channel.

19. An arrangement according to claim 15, wherein the plurality of elements are deflected circularly and downwardly at an end of the power containing channel.

20. An arrangement according to claim 16, wherein the plurality of elements are deflected circularly and downwardly at an end of the power containing channel.

* * * * *